United States Patent
Parker

(10) Patent No.: US 10,415,311 B2
(45) Date of Patent: Sep. 17, 2019

(54) POLE GRAB AND LADDER INCLUDING THE SAME

(71) Applicant: WERNER CO., Greenville, PA (US)

(72) Inventor: Tom Parker, Jamestown, PA (US)

(73) Assignee: WERNER CO., Greenville, PA (US)

( * ) Notice: Subject to any disclaimer, the term of this patent is extended or adjusted under 35 U.S.C. 154(b) by 0 days.

(21) Appl. No.: 15/810,590

(22) Filed: Nov. 13, 2017

(65) Prior Publication Data

US 2019/0145172 A1    May 16, 2019

(51) Int. Cl.
| | |
|---|---|
| *E06C 7/48* | (2006.01) |
| *E06C 1/34* | (2006.01) |
| *F16B 2/18* | (2006.01) |
| *F16B 2/10* | (2006.01) |

(52) U.S. Cl.
CPC ............... *E06C 7/48* (2013.01); *E06C 1/34* (2013.01); *F16B 2/10* (2013.01); *F16B 2/185* (2013.01)

(58) Field of Classification Search
CPC ... E06C 7/06; E06C 7/48; E06C 7/482; E06C 7/50; E06C 7/505; E06C 7/506; E06C 1/34; F16B 2/10; F16B 2/185
See application file for complete search history.

(56) References Cited

U.S. PATENT DOCUMENTS

| | | | | |
|---|---|---|---|---|
| 799,782 | A * | 9/1905 | Ellinger | ............... E06C 7/48 182/214 |
| 1,522,292 | A * | 1/1925 | Enssle | ............... E06C 1/34 182/107 |
| 1,961,289 | A * | 6/1934 | Gardner | ............... E06C 1/34 182/206 |
| 2,194,856 | A * | 3/1940 | Kostuk | ............... E06C 1/22 182/126 |
| 2,499,091 | A * | 2/1950 | Brubaker | ............... E06C 1/397 182/127 |

(Continued)

FOREIGN PATENT DOCUMENTS

| | | |
|---|---|---|
| EP | 0 232 206 A2 | 8/1987 |
| EP | 1 967 688 A2 | 9/2008 |

OTHER PUBLICATIONS

Ladder Safety Solutions Inc., Safe T Claw "Extension Ladder Pole-Clamping Device", http://www.laddersafetysolutions.com/safetclaw.html, 2017, 3 pp.

*Primary Examiner* — Katherine W Mitchell
*Assistant Examiner* — Shiref M Mekhaeil
(74) *Attorney, Agent, or Firm* — Eckert Seamans Cherin & Mellott, LLC

(57) ABSTRACT

A pole grab for use with a ladder, the pole grab including a base unit structured to attach between rails of the ladder such that the base unit can rotate between a stowed position and a deployed position, the base unit including at least one retractable latch mechanisms structured to extend and engage with at least one corresponding receiving point on at least one of the rails of the ladder to prevent rotation of the base unit and to retract and disengage with the at least one corresponding receiving point on the at least one of the rails of the ladder to allow rotation of the base unit, and an arm assembly attached to the base unit and including a pair of arms pivotally attached to corresponding pivot points spaced a predetermined distance apart from each other on the base unit, the pair of arms being structured to pivot between an open position and a closed position.

14 Claims, 9 Drawing Sheets

(56) References Cited

U.S. PATENT DOCUMENTS

| | | | | |
|---|---|---|---|---|
| 2,775,489 A * | 12/1956 | Hagadorn | ........... | E04G 3/00 |
| | | | | 182/129 |
| 3,336,999 A * | 8/1967 | McSwain | ........... | A45F 3/26 |
| | | | | 182/106 |
| 3,715,012 A | 2/1973 | Perry | | |
| 3,929,208 A * | 12/1975 | Hendrich | ........... | E06C 7/48 |
| | | | | 182/108 |
| 3,995,714 A | 12/1976 | Brookes et al. | | |
| 4,018,301 A * | 4/1977 | Nameche | ........... | E06C 1/34 |
| | | | | 182/206 |
| 4,090,587 A * | 5/1978 | Pyle | ........... | E06C 1/34 |
| | | | | 182/206 |
| 4,363,378 A | 12/1982 | Williams et al. | | |
| 4,467,890 A | 8/1984 | McCallum et al. | | |
| 4,469,195 A * | 9/1984 | Sartain | ........... | E06C 7/48 |
| | | | | 182/107 |
| 4,552,246 A | 11/1985 | Thomas | | |
| 4,574,918 A * | 3/1986 | Marques | ........... | E06C 1/52 |
| | | | | 182/164 |
| 4,946,004 A * | 8/1990 | Henson | ........... | E06C 1/34 |
| | | | | 182/107 |
| 4,995,476 A * | 2/1991 | Buck | ........... | E06C 1/34 |
| | | | | 182/107 |
| 5,054,581 A | 10/1991 | Henson | | |
| 5,279,390 A | 1/1994 | Phillips | | |
| 5,332,063 A | 7/1994 | Amacker | | |
| 5,368,127 A | 11/1994 | Phillips | | |
| 5,590,738 A * | 1/1997 | Hunt | ........... | A01M 31/02 |
| | | | | 182/116 |
| 5,638,916 A * | 6/1997 | Schneider | ........... | E06C 1/34 |
| | | | | 182/116 |
| 6,029,774 A * | 2/2000 | Cothern | ........... | E06C 7/188 |
| | | | | 182/107 |
| 6,244,382 B1 * | 6/2001 | Labonte | ........... | E06C 7/48 |
| | | | | 182/107 |
| 6,250,424 B1 | 6/2001 | Laug | | |
| 6,698,547 B1 * | 3/2004 | Uridel | ........... | E06C 7/14 |
| | | | | 182/107 |
| 6,698,548 B1 * | 3/2004 | Verrill | ........... | E06C 1/39 |
| | | | | 182/129 |
| 6,830,128 B2 | 12/2004 | Burgeson | | |
| 7,168,521 B1 * | 1/2007 | Murray | ........... | A01M 31/02 |
| | | | | 182/116 |
| 7,963,368 B2 | 6/2011 | Scudera et al. | | |
| 8,011,476 B1 * | 9/2011 | Alcon | ........... | E06C 7/16 |
| | | | | 182/116 |
| 8,083,192 B2 | 12/2011 | Wells et al. | | |
| 8,316,993 B1 * | 11/2012 | Rudd | ........... | E06C 7/48 |
| | | | | 182/107 |
| 8,381,877 B1 | 2/2013 | Freund | | |
| 8,528,695 B1 | 9/2013 | Orpia | | |
| 8,684,138 B1 | 4/2014 | Marsh, II | | |
| 8,794,383 B2 | 8/2014 | Furseth et al. | | |
| 8,997,932 B1 * | 4/2015 | Ochoa | ........... | E06C 7/48 |
| | | | | 182/116 |
| 9,332,748 B2 * | 5/2016 | Brown | ........... | A01M 31/02 |
| 9,404,306 B2 * | 8/2016 | Russell | ........... | E06C 7/48 |
| 9,540,875 B2 | 1/2017 | Ellis | | |
| 9,593,531 B2 * | 3/2017 | Ballard | ........... | E06C 7/48 |
| 9,593,951 B2 | 3/2017 | Strietzel et al. | | |
| 2002/0108811 A1 | 8/2002 | Ulmschneider et al. | | |
| 2004/0216955 A1 | 11/2004 | Unger | | |
| 2005/0139425 A1 * | 6/2005 | Thomas | ........... | E06C 1/34 |
| | | | | 182/214 |
| 2005/0284703 A1 * | 12/2005 | Deuer | ........... | E06C 1/36 |
| | | | | 182/206 |
| 2007/0209875 A1 * | 9/2007 | Chen | ........... | E06C 1/125 |
| | | | | 182/195 |
| 2009/0242328 A1 * | 10/2009 | Cabrera | ........... | E06C 7/06 |
| | | | | 182/111 |
| 2010/0018803 A1 * | 1/2010 | Schwenke | ........... | E06C 1/34 |
| | | | | 182/206 |
| 2010/0213007 A1 * | 8/2010 | Richards | ........... | E06C 1/08 |
| | | | | 182/107 |
| 2010/0213009 A1 * | 8/2010 | Guinovart | ........... | E06C 1/08 |
| | | | | 182/206 |
| 2010/0258379 A1 * | 10/2010 | Mickens | ........... | B60R 3/00 |
| | | | | 182/111 |
| 2014/0096367 A1 * | 4/2014 | Heard | ........... | E06C 7/188 |
| | | | | 29/525.08 |
| 2014/0166397 A1 | 6/2014 | Reynolds | | |
| 2015/0047927 A1 * | 2/2015 | Nodarse | ........... | E06C 7/06 |
| | | | | 182/209 |
| 2016/0227761 A1 | 8/2016 | Overbaugh | | |
| 2016/0281428 A1 * | 9/2016 | Rudd | ........... | E06C 7/48 |

* cited by examiner

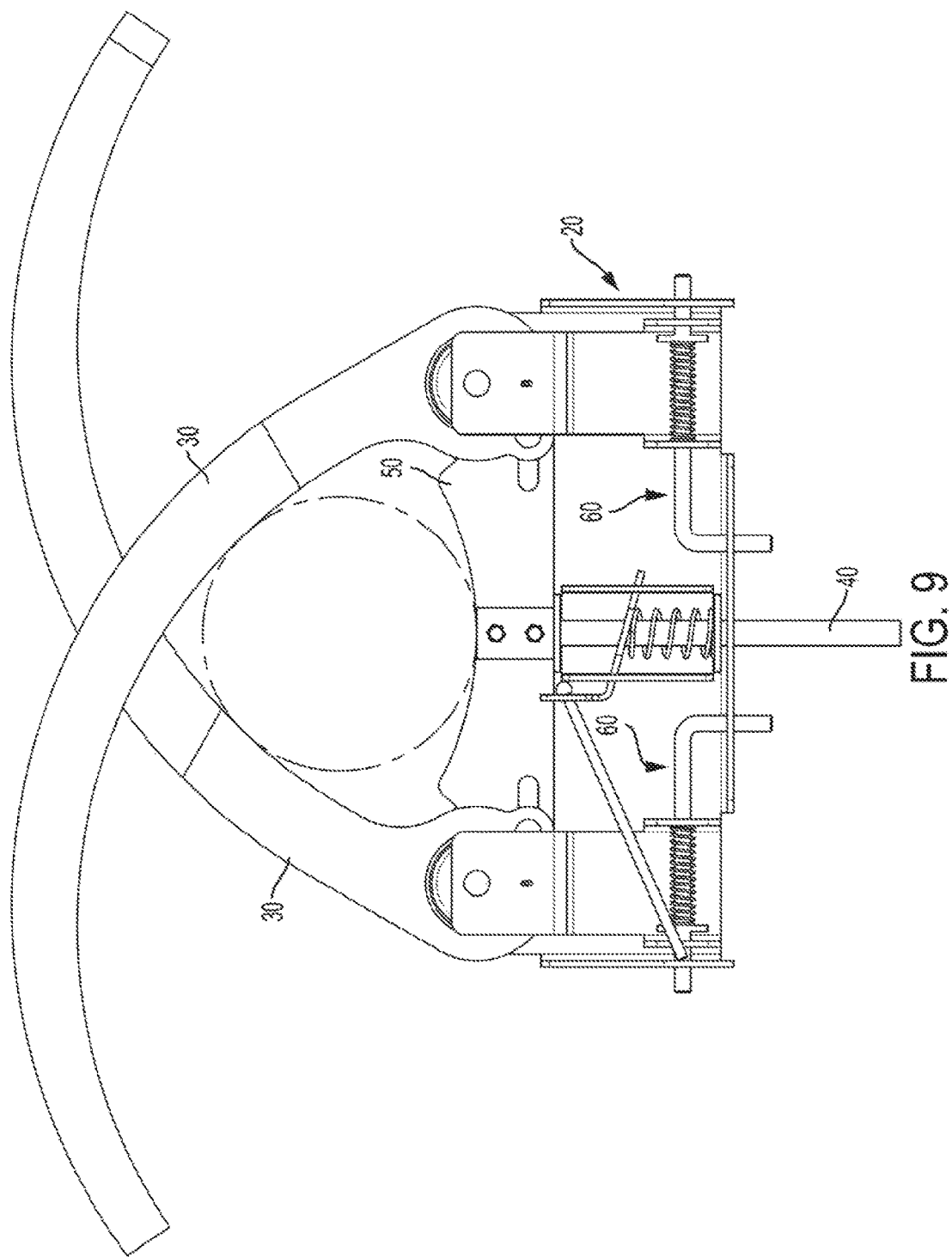

POLE GRAB AND LADDER INCLUDING THE SAME

BACKGROUND

Field

The disclosed concept relates generally to ladders, and in particular, to a pole grab for use with a ladder.

Background Information

Safety is important when using ladders. When using a ladder in conjunction with a flat side of a building, leaning the ladder against the side of the building is generally considered safe enough for use. In other applications though, a flat surface may not be available to lean the ladder against.

Ladders are often used in applications such as utility work or tree trimming and cutting. Utility poles, and similarly, trees, do not provide a flat surface to lean a ladder against. Leaning a ladder against a utility pole or tree can create an unsafe condition as the ladder may tend to twist or slide as a result of being leaned against a curved surface. As such, supplemental equipment should be used to secure the ladder against the utility pole or tree so that is may be used safely. Any supplemental equipment that is employed should be practical and convenient to use.

SUMMARY

These needs and others are met by embodiments of the disclosed concept in which a pole grab for use with a ladder includes a pair of arms and a latching mechanism to secure the pole grab between stowed and deployed positions.

In accordance with one aspect of the disclosed concept, a pole grab for use with a ladder comprises: a base unit structured to attach between rails of the ladder such that the base unit can rotate between a stowed position and a deployed position, the base unit including at least one retractable latch mechanisms structured to extend and engage with at least one corresponding receiving point on at least one of the rails of the ladder to prevent rotation of the base unit and to retract and disengage with the at least one corresponding receiving point on the at least one of the rails of the ladder to allow rotation of the base unit; and an arm assembly attached to the base unit and including a pair of arms pivotally attached to corresponding pivot points spaced a predetermined distance apart from each other on the base unit, the pair of arms being structured to pivot between an open position and a closed position.

In accordance with another aspect of the disclosed concept, a ladder comprises: a pair of rails extending the height of the ladder; and a pole grab including: a base unit attached between the rails such that the base unit can rotate between a stowed position and a deployed position, the base unit including a pair of retractable latch mechanisms structured to extend and engage with corresponding receiving points on the rails to prevent rotation of the base unit and to retract and disengage with the corresponding receiving points on the rails to allow rotation of the base unit; and an arm assembly attached to the base unit and including a pair of arms pivotally attached to corresponding pivot points spaced a predetermined distance apart from each other on the base unit, the pair of arms being structured to pivot between an open position and a closed position.

BRIEF DESCRIPTION OF THE DRAWINGS

A full understanding of the disclosed concept can be gained from the following description of the preferred embodiments when read in conjunction with the accompanying drawings in which:

FIG. 9 is a view of a pole grab with its arms in a closed position in accordance with an example embodiment of the disclosed concept.

DESCRIPTION OF THE PREFERRED EMBODIMENTS

Figure 1:
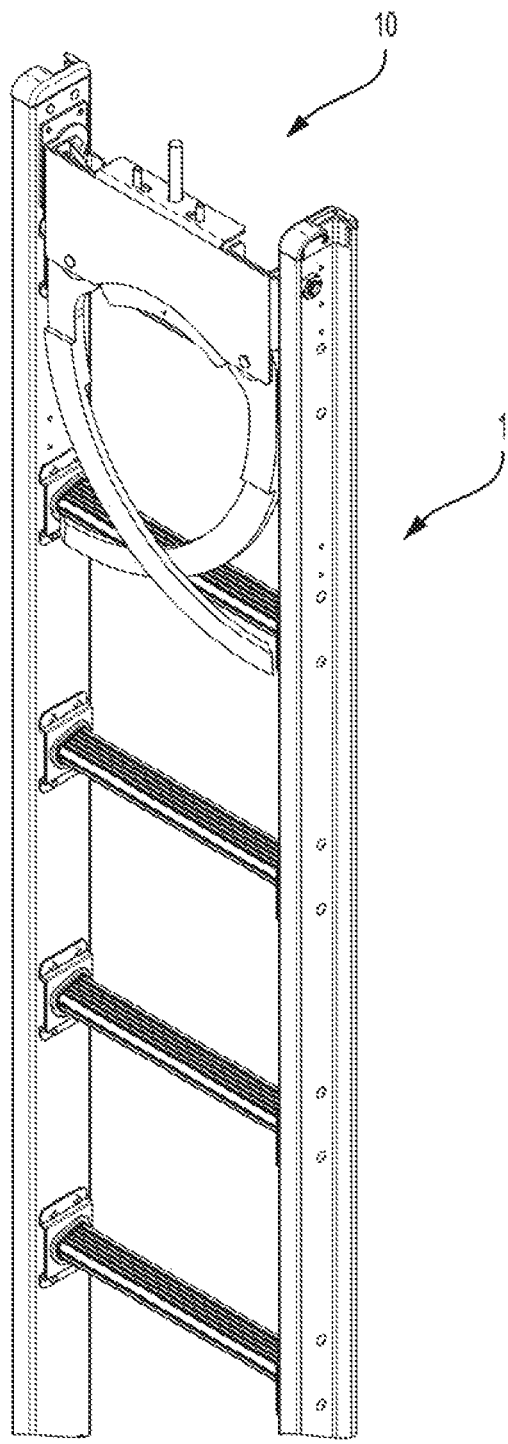
FIG. 1 is a view of a ladder with a pole grab in a stowed position in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
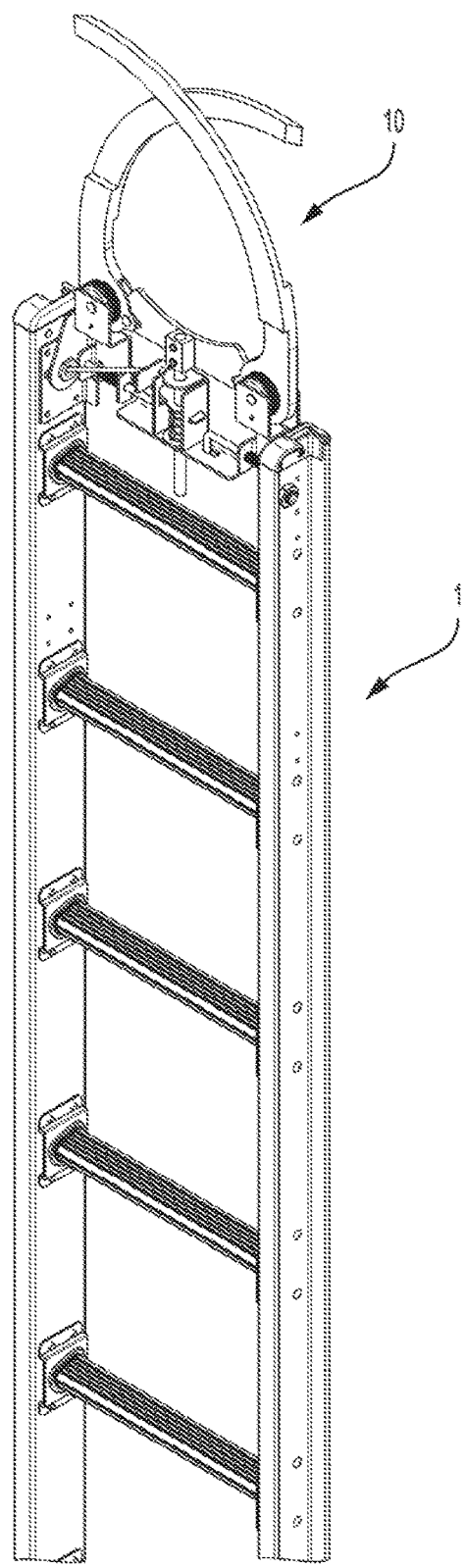
FIG. 2 is a view of the ladder of FIG. 1 with the pole grab between a stowed and a deployed position in accordance with an example embodiment of the disclosed concept.
Figure 3:
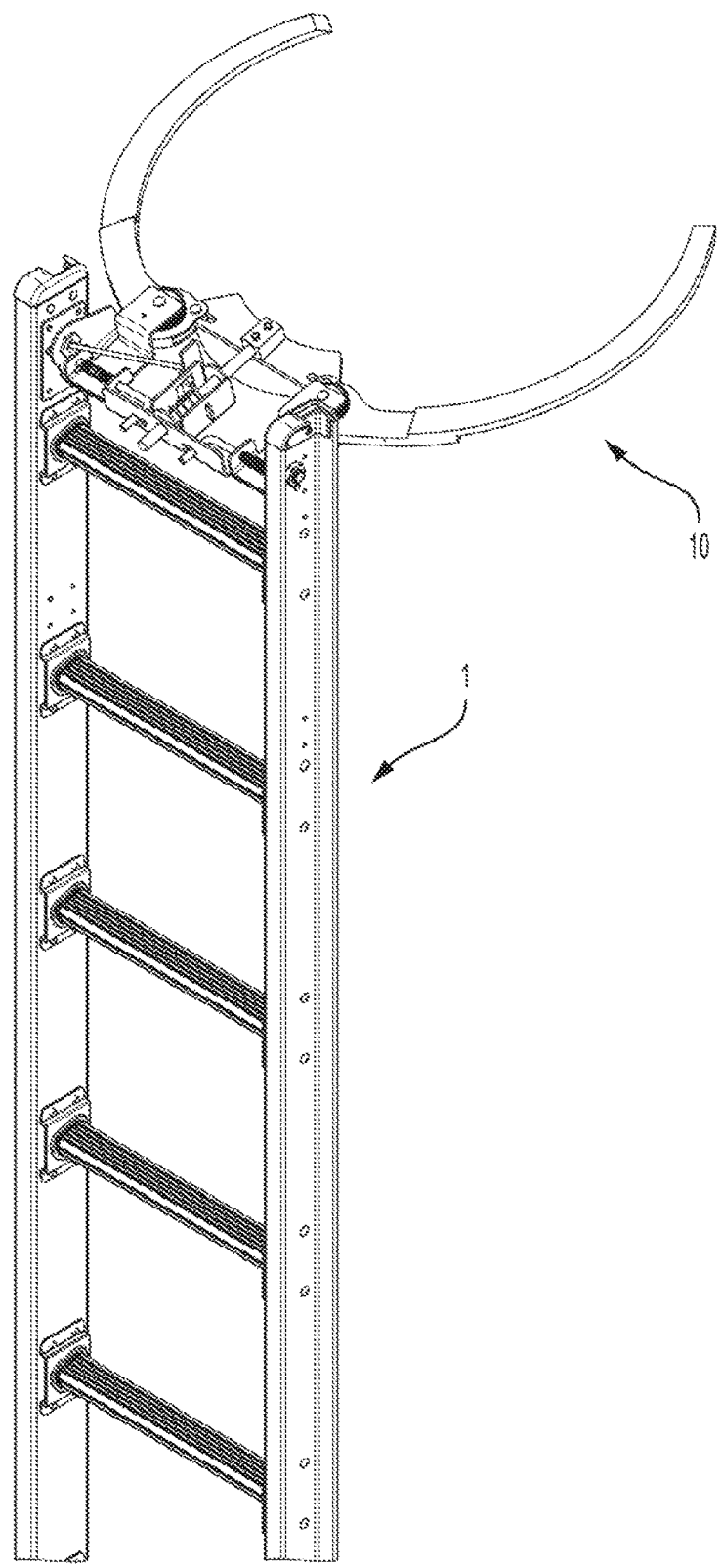
FIG. 3 is a view of the ladder of FIG. 1 with the pole grab in a deployed position in accordance with an example embodiment of the disclosed concept.
Figure 4:
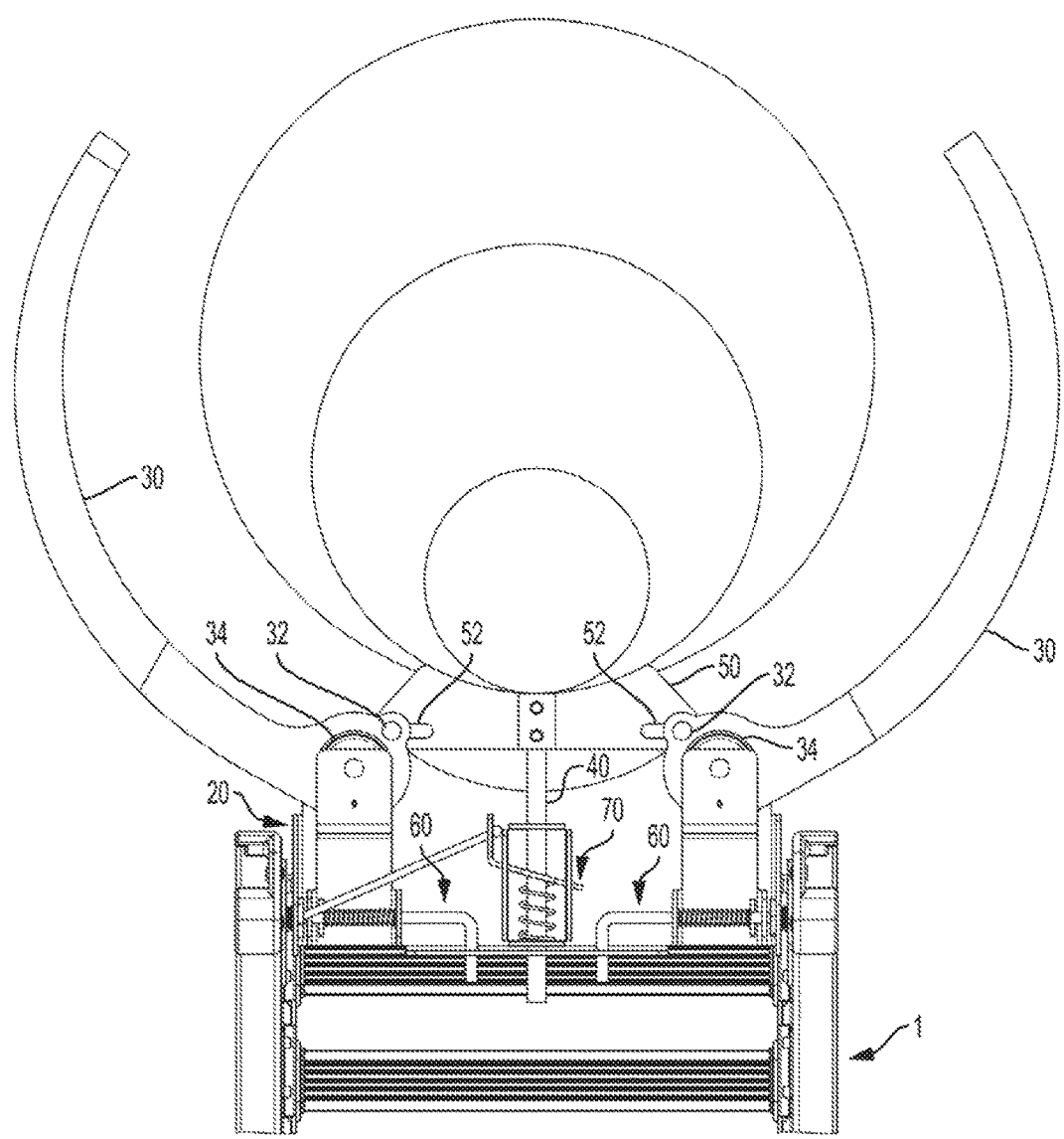
FIG. 4 is a view of a pole grab attached to a ladder in accordance with an example embodiment of the disclosed concept.
Figure 5:
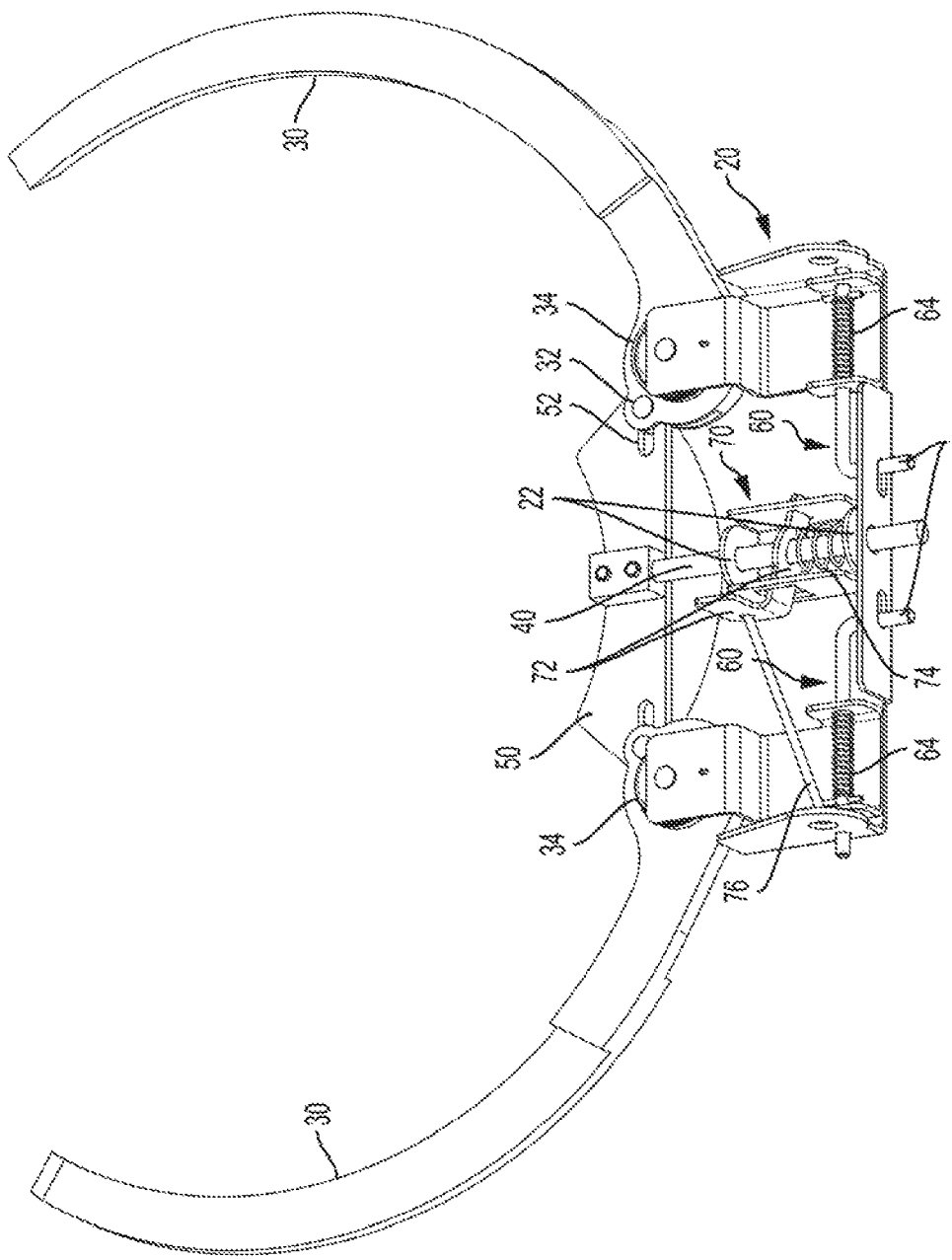
FIG. 5 is a view of a pole grab in accordance with an example embodiment of the disclosed concept.

FIG. 1 is a view of a ladder 1 with a pole grab 10 attached to its top end in accordance with an example embodiment of the disclosed concept. FIGS. 2 and 3 are additional view of the ladder 1 and pole grab 10 of FIG. 1. In FIG. 1, the pole grab 10 is in a stowed position. In FIG. 2, the pole grab 10 is between a stowed position and a deployed position and, in FIG. 3, the pole grab 10 is in a deployed position. FIGS. 4 and 5 are views of the pole grab 10 in more detail.

Figure 7:
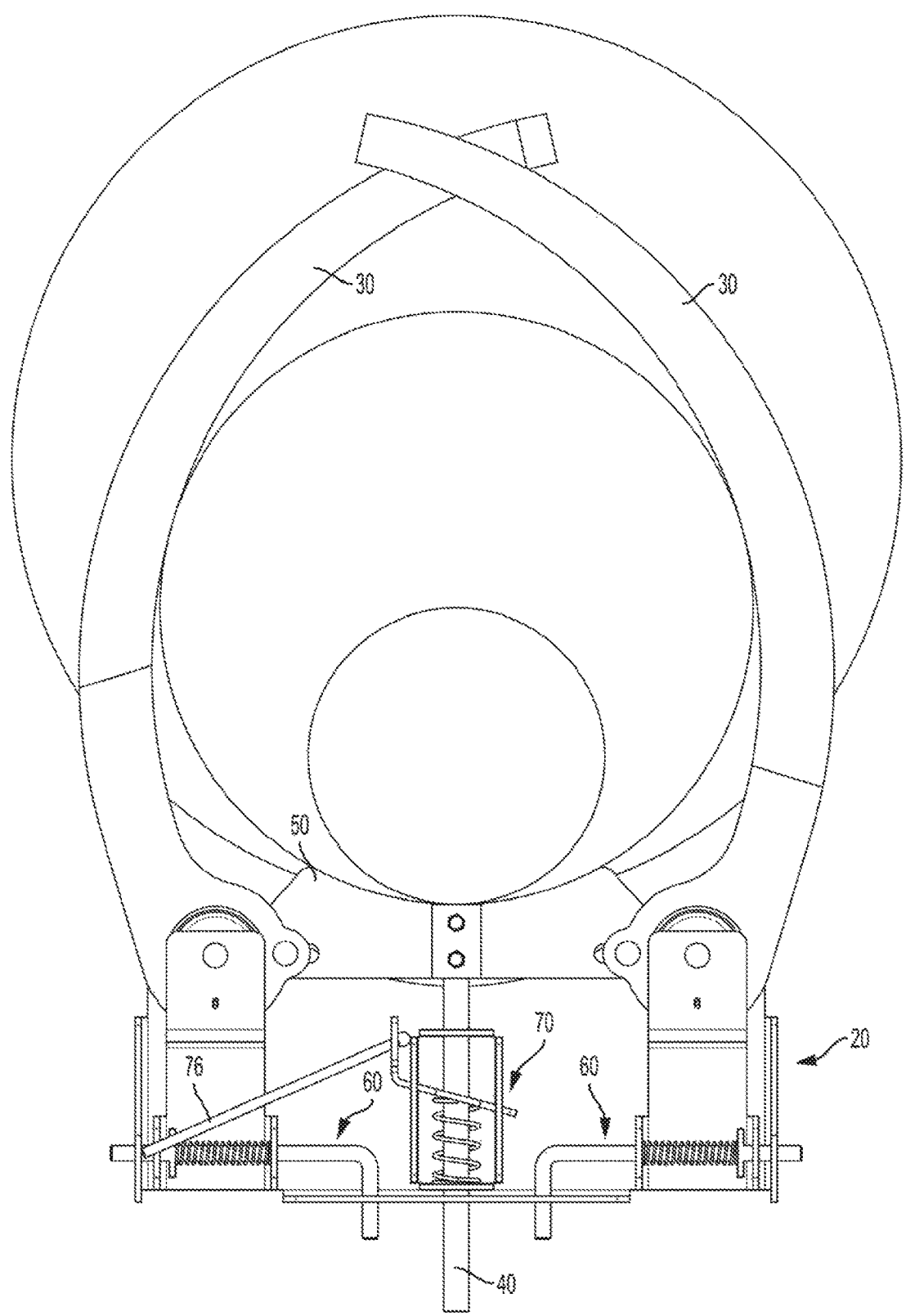
FIG. 7 is a view of a pole grab grasping a 12 inch diameter pole in accordance with an example embodiment of the disclosed concept.

The pole grab 10 includes a base unit 20 and an arm assembly including a pair of arms 30. The arms 30 are pivotally attached to the base unit 20 such that they can pivot between an open position and a closed position. In FIG. 5, the arms 30 are shown in the open position. FIG. 9 shows an example of the arms 30 in the closed position. By pivoting the arms 30 from the open position to the closed position, the arms 30 are able to grasp an object such as a pole. For example, FIG. 4 shows examples of poles having diameters of 6 inches, 12 inches, and 18 inches disposed between the arms 30. Pivoting the arms 30 toward the closed position will cause the arms 30 to grasp the pole between them. FIG. 7 shows an example of the arms 30 grasping a 12 inch diameter pole.

Grasping the pole with the pole grab 10 secures the ladder 1 against the pole. That is, the pole grab 10 will keep the ladder 1 from sliding or twisting with respect to the pole. The pole grab 10 thus allows the ladder 1 to be used safely against a pole or other similarly shaped object such as a tree. In some example embodiments, the arms 30 have an arced shape to facilitate grasping the pole. However, it will be appreciated by those having ordinary skill in the art that other shapes may be employed without departing from the scope of the disclosed concept. In some example embodiments of the disclosed concept, inside surfaces of the arms 30 (e.g., surfaces that will contact the pole) may be covered in a resilient material such as rubber to facilitate grasping the pole. Also, in some example embodiments of the disclosed concept, inside surfaces of the arms 30 may be equipped with teeth or serrations to facilitate gripping the pole.

The base unit 20 of the pole grab 10 is rotatably attached between rails of the ladder 1. The base unit 20 is able to rotate between the stowed position (shown in FIG. 1) and the deployed position (shown in FIG. 3). In the stowed position, the arms 30 extend downward between the rails of the ladder 1, as shown in FIG. 1. Also, in the stowed position, the pole grab 10 does not extend beyond the width of the rails, as is also shown in FIG. 1. As such, when storing or transporting the ladder 1 with the pole grab 10 in the stowed position, the ladder 1 will only take the same amount of space as if it did not include the pole grab 10. Thus, the pole grab 10 does not cause an inconvenience in storing or transporting the ladder 1. In the deployed position (shown in FIG. 3), the arms 30 extend from the base unit 20 in a direction substantially perpendicular with respect to the rails of the ladder 1. In the deployed position, the arms 30 are positioned such that they can be placed around a pole and grasp the pole to secure the ladder 1 against the pole.

The base unit 20 of the pole grab 10 is rotatably attached to the rails of the ladder 1 by frame pivots 82. The frame pivots 82 extend from the base unit 20 and through the rails of the ladder 1 to attach the pole grab 10 to the ladder 1. The base unit 20 is able to rotate about the frame pivots 82. In this manner, the base unit 20 is able to rotate between the stowed position and the deployed position.

The base unit 20 further includes a pair of latch mechanisms 60. The latch mechanisms 60 are retractable. The latch mechanisms 60 are structured to extend and engage with corresponding receiving points on the rails of the ladder 1 to prevent rotation of the base unit 20. The latch mechanisms 60 are also structured to retract and disengage with the corresponding receiving points on the rails of the ladder 1 to allow the base unit 20 to rotate. By retracting the latch mechanisms 60, the base unit 20 may be rotated between the stowed and deployed positions. The latch mechanisms 60 may then extend and engage to secure the base unit 20 in the selected position and prevent it from rotating to another position. In this manner, the pole grab 10 may be secured in the deployed position when in use and then secured in the stowed position when not in use. While the pair of latch mechanisms 60 are shown, it will be appreciated that in some example embodiments of the disclosed concept, a single latch mechanism 60 or more than a pair of latch mechanisms 60 may be employed.

In some example embodiments of the disclosed concept, the latch mechanisms 60 each include an L-shaped member 62 and a latch spring 64. A first end of the L-shaped member 62 is structured to extend from the base unit 20 and engage the corresponding receiving point on the rail of the ladder 1. The corresponding receiving point may be a selected recess formed in a pivot plate 80 (shown in FIG. 6) attached to a rail of the ladder 1. For example, the pivot plate 80 may include recesses corresponding to stowed position and the deployed position and being shaped to receive the first end of the L-shaped member 62. In some example embodiments of the disclosed concept, the recesses may be formed directly in the rails of the ladder 1. In any case, when the first end of the L-shaped member 62 is engaged with the corresponding receiving point, the base unit 20 is prevented from rotating.

A second end of the L-shaped member 62 extends from an opening in the base unit 20 as is shown in FIG. 5. The latch spring 64 is disposed around the L-shaped member 62 and is structured to bias the first end of the L-shaped member towards the corresponding receiving point in the rail of the ladder 1. Thus, in a rest state, the latch mechanism 60 will engage with the receiving point and prevent the base unit 20 from rotating. Pulling the second end of the L-shaped member 62 in a direction away from the first end of the L-shaped member 62 causes the first end of the L-shaped member 62 to disengage with the corresponding receiving point on the rail of the ladder 1 and allow the base unit 20 to rotate again. Thus, pulling the second ends of the pair of L-shaped members 62 toward each other will cause both latch mechanisms 60 to simultaneously disengage with the corresponding receiving points in the rails of the ladder 1 and allow the base unit 20 to be rotated. Releasing the second ends of the L-shaped members 62 will then cause the latch mechanisms 60 to engage with the corresponding receiving points in the rails of the ladder 1 and prevent the base unit 20 from rotating. Thus, the pole grab 10 can easily be released from the stowed or deployed position and re-secured in the selected position without the need for any tools.

The pole grab 10 further includes a push rod 40 and a push bar 50. The push rod 40 is slidably attached to the base unit 20. In some example embodiments, the base unit 20 includes rod guides 22 through which the push rod 40 may slide into and out of the base unit 20. The push rod 40 is attached to the push bar 50 such that the push rod 40 and the push bar 50 move in unison with each other. That is, moving the push bar 50 toward the base unit 20 will cause the push rod 40 to slide into the base unit 20 and moving the push bar 50 away from the base unit 20 will cause the push rod 40 to slide out of the base unit 20.

The push bar 50 is also attached to the arms 30. The push bar 50 is structured such that moving the push bar 50 towards the base unit 20 causes the arms 30 to pivot toward the closed position and moving the push bar 50 away from the base unit 20 causes the arms 30 to pivot toward the open position. To facilitate this action, in some example embodiments of the disclosed concept, the push bar 50 is a planar member including a pair of slotted openings 52. The arms 30 each include a connector member 32, such as a rod, that is structured to pass through the corresponding slotted opening 52 to attach the arm 30 to the push bar 50. When the push bar 50 is moved towards or away from the base unit 20, the motion causes the connector members 32 to slide along the slotted openings 52, which is turn causes the arms 30 to pivot towards the open or closed position.

The base unit 20 further includes a locking mechanism 70. The locking mechanism 70 has a locked state and an unlocked state. The locking mechanism 70 is able to be selectively switched between the locked state and the unlocked state. In the locked state, the locking mechanism 70 prevents the push bar 50 from moving away from the base unit 20, but allows the push bar 50 to move toward the base unit 20. That is, the push bar 50 is able to move toward the base unit 20 and cause the arms 30 to pivot toward the closed position, but does not allow the push bar 50 to move away from the base unit 20 and allow the arms 30 to pivot toward the open position. The locked state is useful for grasping a pole with the pole grab 10 and securing the ladder 1 against the pole. For example, pressing the pole grab 10 against the pole will cause the push bar 50 to be pushed toward the base unit 20 so that the arms 30 pivot toward the closed position and grasp the pole. In the locked state, the push bar 50 is not able to move away from the base unit 20 and cause the arms 30 to pivot toward the open position. Thus, the arms 30 will not release their grasp on the pole when the locking mechanism 70 is in the locked state.

In the unlocked state, the push bar 50 is able to move both toward and away from the base unit 20. Thus, in the unlocked state, the arms 30 are able to release their grasp on the pole. The unlocked state is useful for when a user has finished their work and would like to release the ladder 1 from the pole.

The locking mechanism 70 includes a lock 72 and a lock spring 74. The lock 72 is formed by a bent member having an opening structured to receive the push rod 40, as shown in FIG. 5. The bent member includes a first portion which includes the opening and a second portion arranged substantially perpendicular to the first portion. The lock spring 74 is structured to bias the bent member toward the push bar 40 which causes the locking mechanism 70 to lock. For example, the lock spring 74 biases the bent member so that the first portion of the bent member is angled upward toward the push bar 50, as is shown in FIGS. 5 and 7. When the first portion of the bent member is angled in this manner, the push bar 50 cannot be moved away from the base unit 20 due to the interaction between the bent member and the push bar 40. For example, the first portion of the bent member is limited in the amount it can be angled upward toward the push bar 50 and once it has reached the limit, which happens when the lock spring 74 biases it, the first portion of the bent member cannot be angled further in that direction and, thus, the push bar 50 cannot be moved further away from the base unit 20. However, the push bar 50 can move in the other direction, toward the base unit 20, without being impeded by the locking mechanism 70.

Figure 8:
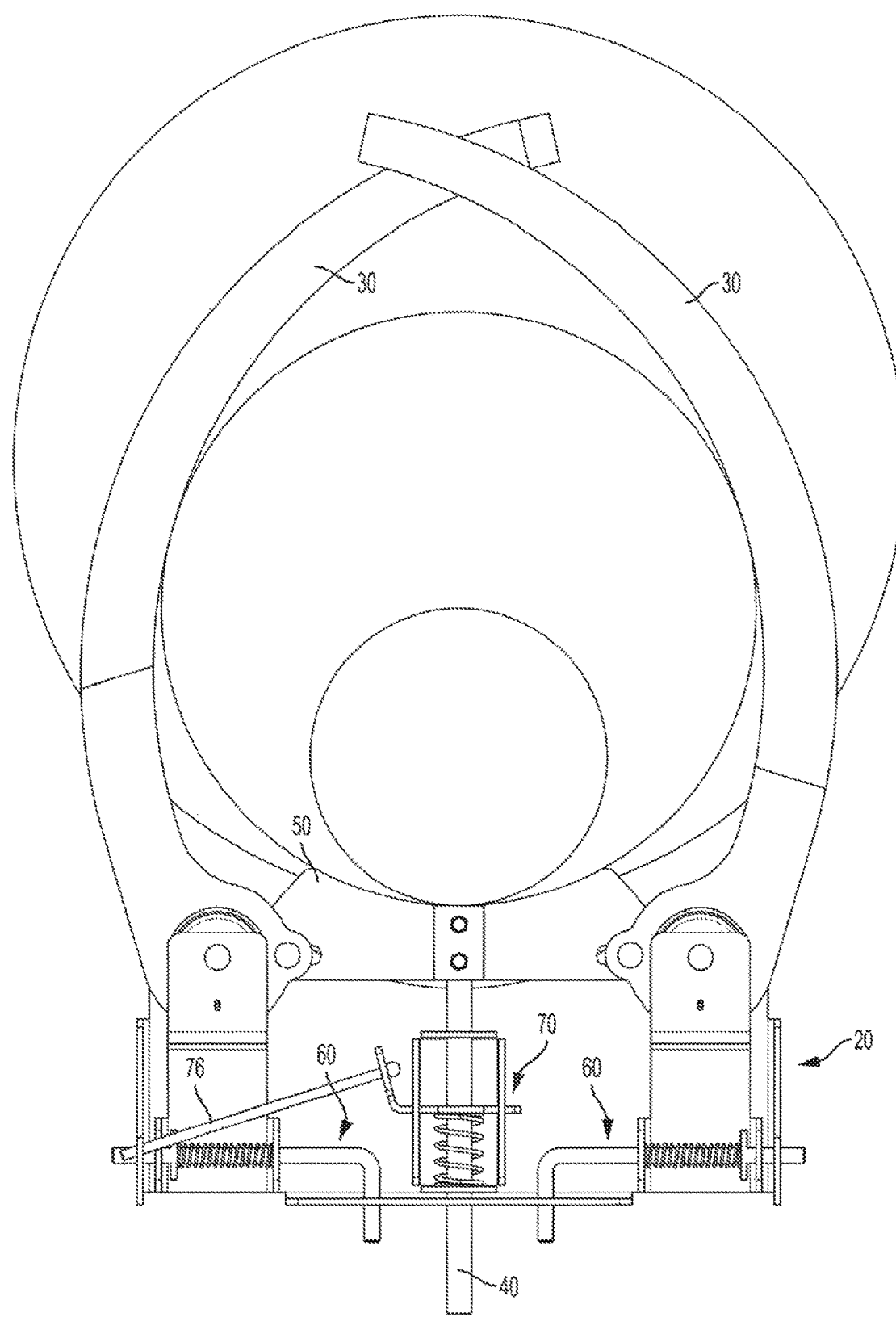
FIG. 8 is a view of the pole grab of FIG. 7 after a locking mechanism of the pole grab has been unlocked in accordance with an example embodiment of the disclosed concept.

Pulling the second portion of the bent member away from the push bar 50 causes the locking mechanism 70 to unlock. For example, FIG. 8 shows the locking mechanism 70 in the unlocked state. As shown in FIG. 7, the second portion of the bent member has been pulled away from the push bar 50 such that the first portion of the bent member is no longer angled toward the push bar 50. Since the first portion of the bent member is no longer angled toward the push bar 50, the push rod 40 can slide in either direction through the opening in the first portion of the bent member. Thus, the push bar 50 can move both toward and away from the base unit 20 in the unlocked state.

To facilitate unlocking the locking mechanism 70, the pole grab includes a cord 76. The cord 76 is attached to the second portion of the bent member of the lock 70. Pulling on the cord 76 pulls the second portion of the bent member away in a direction away from the push bar 50 and causes the locking mechanism 70 to unlock. In some example embodiments, the cord 76 extends through one of the frame pivots 82 (shown in FIG. 6) out of the base unit 20 and down one of the rails of the ladder 1. To facilitate the cord 76 passing through the frame pivot 82, the frame pivot 82 may have a hollow core. The cord 76 may extend down the rail of the ladder 1 to the bottom of the ladder 1. Thus, a user at the bottom of the ladder 1 can pull on the cord 76 to unlock the locking mechanism 70. Additionally, the cord 76 will not get tangled due to rotation of the base unit 20. In this manner, the locking mechanism 70 can be unlocked and cause the pole grab 10 to release its grasp of a pole from the bottom of the ladder 1. A user does not need to be on the ladder 1 by the pole grab 10 to cause the pole grab 10 to release its grasp on the pole. Having a user on the ladder 1 when the pole grab 10 releases its grasp on the pole would present a safety issue.

The pole grab 10 further includes arm springs 34 shown, for example, in FIG. 5. The arm springs 34 are structured to bias the arms 30 to the open position. While the locking mechanism 70 is locked, the arms 30 are not able to move toward the open position because the push bar 50 is unable to move away from the base unit 20. However, once the locking mechanism 70 is unlocked, the arms 30 are able to move towards the open position. Thus, once the locking mechanism 70 is unlocked, the bias applied by the arm springs 34 will cause the arms 30 to move to the open position. The arm springs 34 are helpful in causing the pole grab 10 to release its grasp on a pole. For example, if the pole grab 10 is grasping a pole when a user at the base of the ladder 1 pulls on the cord 76 to unlock the locking mechanism 70, the arms 30 of the pole grab will automatically move toward the open position due to the arm springs 34 and release their grasp on the pole.

Figure 6:
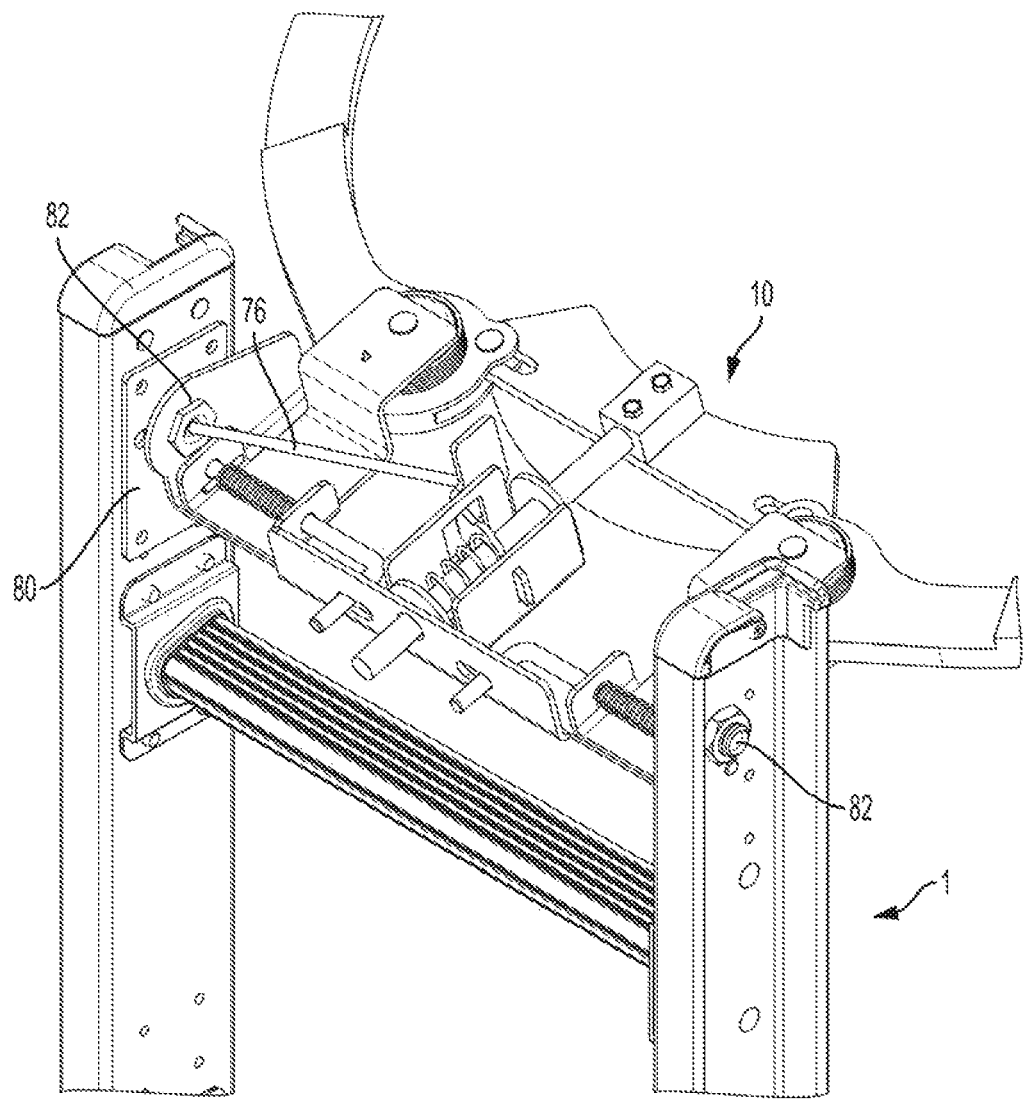
FIG. 6 is another view of a pole grab attached to a ladder in accordance with an example embodiment of the disclosed concept.

FIGS. 6-9 show additional views of the pole grab 10 in accordance with example embodiments of the disclosed concept. FIG. 6 is a view of the pole grab 10 attached to the top of the ladder 1. FIG. 6 illustrates a frame pivot 82 that includes a hollow core through which the cord 76 passes. The cord 76 may emerge from the frame pivot 82 on the outside of the rail of the ladder 1 and extend down the rail of the ladder 1 to where a user may pull the cord 76 from the bottom of the ladder. FIG. 7 is a view of the pole grab 10 in which the arms 30 are grasping a pole that has a 12 inch diameter. In some example embodiments of the disclosed concept, the pole grab 10 and arms 30 may be structured to grasp a pole having a diameter of at least 18 inches. However, it will be appreciated by those having ordinary skill in the art that the pole grab 10 and arms 30 may be configured to grasp poles having smaller or larger diameters without departing from the scope of the disclosed concept. It will also be appreciated that the pole grab 10 and arms 30 are not limited to grasping poles. For example, the pole grab 10 and arms 30 may grasp other objects such as trees or other structures without departing from the scope of the disclosed concept.

As shown in FIG. 7, the pole is pressed against the push bar 50. For example, pressing the push bar 50 of the pole grab against the pole will cause the push bar 50 to move towards the base unit 20 and the arms 30 to move toward the closed position. Once the arms 30 have moved far enough toward the closed position that they contact the pole, as is shown in FIG. 7, the arms 30 can be considered to be grasping the pole and the pole grab 10 and ladder 1 will be secured against the pole. The force with which the arms 30 grasp the pole is related to the force with which the pole grab 10 is pressed against the pole. Thus, when the ladder 1 is leaned up against the pole and the push bar 50 is pressed against the pole, the weight of the ladder 1 and pole grab 10 will press the push bar 50 toward the base unit 20 and cause the arms 30 to pivot toward the closed position. When a user begins climbing the ladder 1, the weight of the user will cause the push bar 50 to be pressed harder against the pole, thus causing the arms 30 to more tightly grasp the pole. The pole grab 10 thus provides additional safety as the weight of a user climbing the ladder 1 causes the pole grab 10 to more firmly grasp the pole and secure the ladder 1 against the pole.

As shown in FIG. 7, the locking mechanism 70 is locked. This is evident because the bent member is angled toward the push bar 50. FIG. 8 shows a view of the pole grab 10 where the locking mechanism 70 is unlocked. As shown in FIG. 8, the bent member is not angled toward the push bar 50. In the state shown in FIG. 8, the arms 30 may move toward the open position and release their grasp on the pole. As previously described, the arm springs 34 will bias the arms 30 to the open position. FIG. 9 is another view of the pole grab 10. In FIG. 9, the pole grab 10 is shown with the arms 30 in the closed position. That is, the push bar 50 has been moved all the way toward the base unit 20 and the arms 30 have pivoted toward each other as far as they can.

As described herein, the pole grab 10 is able to grasp a pole to secure the ladder 1 against the pole. The pole grab 10 is rotatable to a stowed position where it does not extend beyond the rails of the ladder 1 so that a ladder 1 including the pole grab 10 can be conveniently stored. Additionally, when the pole grab 10 is in the stowed position, a user can use the ladder 1 in a conventional application where the pole grab 10 is not needed. For example, when the pole grab 10 is in the stowed position, the ladder 1 can be leaned against a flat structured and used conventionally with the pole grab 10 still attached. The pole grab 10 also allows a user to unlock the locking mechanism 70 from the bottom of the ladder 1, thus preventing an unsafe condition of unlocking the locking mechanism 70 with a user on the ladder 1. The pole grab 10 also provides for convenient use in that simply leaning the ladder 1 with the pole grab 10 against a pole causes the push bar 50 to be moved toward the base unit 20 and for the arms 30 to grasp the pole.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A pole grab for use with a ladder, the pole grab comprising:
    a base unit structured to attach between rails of the ladder such that the base unit can rotate between a stowed position and a deployed position, the base unit including at least one retractable latch mechanism structured to extend and engage with at least one of the rails of the ladder to prevent rotation of the base unit and to retract and disengage with the at least one of the rails of the ladder to allow rotation of the base unit; and
    an arm assembly attached to the base unit and including a pair of arms pivotally attached respectively to a pair of corresponding pivot points, said pivot points being spaced a predetermined distance apart from each other on the base unit, the pair of arms being structured to pivot between an open position and a closed position;
    a push rod slidably attached to the base unit;
    a push bar attached to the push rod and the pair of arms; and
    a pair of arm springs attached to the pair of arms and being structured to bias the pair of arm towards the open position,
    wherein the push rod is structured to move in unison with the push bar,
    wherein moving the push bar toward the base unit causes the pair of arms to pivot toward the closed position,
    wherein moving the push bar away from the base unit causes the pair of arms to pivot toward the open position, wherein forward and backward movement of the push bar results in a corresponding movement of the pair of arms along an entire range of movement of the push bar
    wherein the push bar is a planar member having a pair of slotted openings,
    wherein the pair of arms each include a connector member structured to pass through the corresponding slotted opening to attach the push bar and the pair of arms.

2. The pole grab of claim 1, wherein the base unit further comprises:
    a locking mechanism structured to receive the push bar and to selectively lock to prevent the push bar from moving away from the base unit.

3. The pole grab of claim 2, wherein when the locking mechanism is locked, the push bar can be moved toward the base unit and cannot be moved away from the base unit; and wherein when the locking mechanism is unlocked, the push bar can be moved both toward and away from the base unit.

4. The pole grab of claim 3, wherein the locking mechanism further comprises:
    a lock composed of a bent member having a first portion, a second portion arranged substantially perpendicular with respect to the first portion, and an opening formed in the first portion and being structured to receive the push rod; and
    a spring structured to bias the bent member toward the push bar to cause the locking mechanism to lock, and wherein pulling the second portion of the bent member away from the push bar causes the locking mechanism to unlock.

5. The pole grab of claim 4, further comprising:
    a cord attached to the second portion of the bent member, wherein pulling on the cord causes the locking mechanism to unlock.

6. The pole grab of claim 5, wherein the cord is structured to extend out of the base unit and down one of the rails of the ladder.

7. The pole grab of claim 1, wherein the at least one retractable latch mechanism includes:
    an L-shaped member having a first end structured to extend and engage with the at least one rail of the ladder and a second end structured to extend through an opening in the base unit; and
    a latch spring attached to the L-shaped member and being structured to bias the first end of the L-shaped member toward the at least one rail of the ladder, and
    wherein pulling the second end of the L-shaped member in a direction away from the first end of the L-shaped member causes the first end of the L-shaped member to disengage with the at least one rail of the ladder.

8. The pole grab of claim 1, wherein the at least one retractable latch mechanism is a pair of retractable latch mechanisms.

9. The pole grab of claim 1, wherein when the pole grab is in the deployed position, the pair of arms extend from the base unit is a direction substantially perpendicular with respect to the rails of the ladder; and wherein when the pole grab is in the stowed position, the pair of arms extend downward between the rails of the ladder.

10. The pole grab of claim 9, wherein when the pole grab is in the stowed position, the pole grab does not extend beyond the width of the rails of the ladder.

11. The pole grab of claim 1, wherein the pair of arms are structured to grasp a pole by pivoting from the open position toward the closed position.

12. The pole grab of claim 11, wherein the pole hash a diameter of at least 18 inches.

13. The pole grab of claim 1, wherein the base unit further includes a pair of frame pivots structured to extend through the rails of the ladder and rotatably attach the base unit to the rails of the ladder.

14. A ladder comprising:
　a pair of rails extending the height of the ladder; and
　a pole grab including:
　　a base unit attached between the rails such that the base unit can rotate between a stowed position and a deployed position, the base unit including at least one retractable latch mechanism structured to extend and engage with at least one of the rails to prevent rotation of the base unit and to retract and disengage with the at least one of the rails to allow rotation of the base unit; and
　　an arm assembly attached to the base unit and including a pair of arms pivotally attached to corresponding pivot points spaced a predetermined distance apart from each other on the base unit, the pair of arms being structured to pivot between an open position and a closed position;
　　a push rod slidably attached to the base unit;
　　a push bar attached to the push rod and the pair of arms; and
　　a pair of arm springs attached to the pair of arms and being structured to bias the pair of arms toward the open position,
　wherein the push rod is structured to move in unison with the push bar,
　wherein moving the push bar toward the base unit causes the pair of arms to pivot toward the closed position,
　wherein moving the push bar away from the base unit causes the pair of arms to pivot toward the open position, wherein forward and backward movement of the push bar results in a corresponding movement of the pair of arms along an entire range of movement of the push bar
　wherein the push bar is a planar member having a pair of slotted openings,
　wherein the pair of arms each include a connector member structured to pass through the corresponding slotted opening to attach the push bar and the pair of arms.

* * * * *